United States Patent
Rademacher et al.

(10) Patent No.: US 9,790,316 B2
(45) Date of Patent: Oct. 17, 2017

(54) 2-COMPONENT PRIMER COMPOSITION AND METHOD FOR PRODUCING COATINGS USING THE PRIMER COMPOSITION

(71) Applicant: BASF Coatings GmbH, Münster (DE)

(72) Inventors: Josef Rademacher, Münster (DE); Martina Huhn, Münster (DE); Inge Huster, Münster (DE); Carmen Velling, Münster (DE); Jutta Waldmann, Havixbeck (DE); Marion Fischer, Münster (DE); David L. Newton, Whitehouse, OH (US)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 14/760,320

(22) PCT Filed: Jan. 9, 2014

(86) PCT No.: PCT/EP2014/050333
§ 371 (c)(1),
(2) Date: Jul. 10, 2015

(87) PCT Pub. No.: WO2014/108478
PCT Pub. Date: Jul. 17, 2014

(65) Prior Publication Data
US 2015/0344726 A1 Dec. 3, 2015

Related U.S. Application Data

(60) Provisional application No. 61/751,276, filed on Jan. 11, 2013.

(30) Foreign Application Priority Data

Jan. 11, 2013 (EP) .................................... 13150951

(51) Int. Cl.
| | | |
|---|---|---|
| *C09D 175/04* | (2006.01) | |
| *B05D 7/00* | (2006.01) | |
| *C08K 3/36* | (2006.01) | |
| *C08K 3/22* | (2006.01) | |
| *C08K 3/32* | (2006.01) | |
| *C08K 3/34* | (2006.01) | |
| *C08G 18/62* | (2006.01) | |
| *C08G 18/79* | (2006.01) | |
| *C08G 18/10* | (2006.01) | |
| *C08G 18/40* | (2006.01) | |
| *C08K 3/00* | (2006.01) | |

(52) U.S. Cl.
CPC ......... *C08G 18/6225* (2013.01); *B05D 7/542* (2013.01); *C08G 18/10* (2013.01); *C08G 18/4063* (2013.01); *C08G 18/792* (2013.01); *C08K 3/0033* (2013.01); *C08K 3/22* (2013.01); *C08K 3/32* (2013.01); *C08K 3/34* (2013.01); *C08K 3/36* (2013.01); *C09D 175/04* (2013.01); *C08G 2150/90* (2013.01); *C08K 2003/2241* (2013.01); *C08K 2003/321* (2013.01); *C08K 2003/328* (2013.01); *Y10T 428/31605* (2015.04)

(58) Field of Classification Search
CPC .. C08G 18/10; C08G 18/792; C08G 18/4063; C08G 18/6225; C08G 2150/90; B05D 7/542; B05D 7/5423; C09D 175/04; Y10T 428/31605; C08K 2003/2241; C08K 2003/321; C08K 2003/328; C08K 3/0033; C08K 3/22; C08K 3/32; C08K 3/34; C08K 3/36
USPC ................ 428/425.8, 425.9; 427/207.1, 409; 524/872
See application file for complete search history.

(56) References Cited

U.S. PATENT DOCUMENTS

| | | |
|---|---|---|
| 4,914,148 A | 4/1990 | Hille et al. |
| 5,368,944 A | 11/1994 | Hartung et al. |
| 5,658,617 A | 8/1997 | Gobel et al. |

(Continued)

FOREIGN PATENT DOCUMENTS

| | | |
|---|---|---|
| DE | 3545618 | 6/1987 |
| DE | 19715427 | 10/1998 |

(Continued)

OTHER PUBLICATIONS

PCT International Preliminary Report on Patentability in PCT/EP2014/050333, dated Jul. 14, 2015, 7 pages.

(Continued)

*Primary Examiner* — Thao T Tran
(74) *Attorney, Agent, or Firm* — Servilla Whitney LLC

(57) ABSTRACT

The present invention relates to an aqueous two-component primer composition comprising (1) a paint base component comprising (A) at least one polyurethane resin having an OH number of 5 to 60 mg KOH/g, (B) zinc phosphate, (C) at least one pigment, and (2) a curing component comprising (D1) at least one polyisocyanate which is an isocyanurate based on hexamethylene diisocyanate, (D2) at least one polyisocyanate which is a polyether-modified isocyanurate based on isophorone diisocyanate, where the stoichiometric ratio of isocyanate groups in the curing component to the complementary hydroxyl groups in the paint base component is greater than 2. The present invention further relates to a method for producing a coating on a metallic substrate, by applying the primer composition of the invention directly to a substrate. Moreover, the present invention relates to a substrate coated by the stated method.

17 Claims, No Drawings

(56) References Cited

U.S. PATENT DOCUMENTS

| | | | |
|---|---|---|---|
| 5,854,338 A | 12/1998 | Hovestadt et al. | |
| 6,590,029 B1 | 7/2003 | Stenger et al. | |
| 6,737,468 B1 | 5/2004 | Bremser | |
| 2001/0056154 A1* | 12/2001 | Blum .................... | C08F 265/06 |
| | | | 524/522 |
| 2006/0047085 A1 | 3/2006 | Trivedi | |
| 2011/0268964 A1* | 11/2011 | Dornbusch .......... | C08G 18/722 |
| | | | 428/334 |

FOREIGN PATENT DOCUMENTS

| | | |
|---|---|---|
| DE | 19914055 | 9/2000 |
| DE | 19930665 | 1/2001 |
| DE | 10-2009-033194 | 1/2011 |
| EP | 0228003 | 7/1987 |
| EP | 0521928 | 1/1993 |
| EP | 0551568 | 7/1993 |
| EP | 0634431 | 1/1995 |
| WO | WO-91/15528 | 10/1991 |
| WO | WO-92/15405 | 9/1992 |

OTHER PUBLICATIONS

PCT International Search Report in PCT/EP2014/050333, dated Mar. 19, 2014, 4 pages.

\* cited by examiner

2-COMPONENT PRIMER COMPOSITION AND METHOD FOR PRODUCING COATINGS USING THE PRIMER COMPOSITION

CROSS-REFERENCE TO RELATED APPLICATIONS

This application is the National Stage entry of PCT/EP2014/050333, filed on Jan. 9, 2014, which claims priority to European Application Number 13150951.5, filed on Jan. 11, 2013 and U.S. Provisional Application No. 61/751,276, filed Jan. 11, 2013 which are incorporated herein by reference in their entireties.

FIELD

The present invention relates to an aqueous 2-component primer composition comprising a polyurethane resin, a filler component, and two different polyisocyanates. The present invention further relates to a method for producing coatings using the primer composition, where the primer composition is applied directly to a substrate. The coatings exhibit outstanding adhesion and are therefore outstandingly suitable, for example, for increasing the corrosion protection afforded to metallic substrates, especially as part of automotive refinishing.

BACKGROUND

In the context of automotive finishing, a wide variety of different substrates, and more particularly metallic substrates, are coated generally with multiple coats, in order to meet the various technological performance requirements that are imposed on the coated substrates, such as the corrosion resistance, for example. The coatings involved are generally multicoat systems comprising—starting from the metallic substrate—a conversion coating (phosphate coating, for example), and also an electrocoat, a primer-surfacer coat, a basecoat, and a clearcoat. A less complex and hence more economical coat system would be an advantage in this context. In that case, of course, it will still be necessary for the technological performance properties of the overall coating to meet the exacting requirements of the automobile industry.

Attempts are being made, for example, to replace the corrosion-protection electrocoat and the primer-surfacer coat by a single coating that unites the properties of the two aforementioned coats. A particular problem in this context is to maintain appropriate corrosion protection and to attain an acceptable adhesion and hence water and moisture resistance on the part of the overall coating. If attempts are made not only to unite electrocoat and primer-surfacer coat but also to do without the conversion coat, in order to make the coating and the coating process more economical and more quick to implement, the problems in terms of corrosion resistance are intensified still further. For example, the adhesion of substitute coats (primer coats) applied direct to the metallic substrate (direct-to-metal) is often not sufficient to ensure maintenance of the coat even under long-term weathering effects, more particularly moisture effects.

The problems addressed are of relevance not only in the context of the original (OEM) finishing of substrates—such as, for example, of substrates which are painted as part of automotive OEM finishing. These problems must also be paid particular attention in the refinish segment, more particularly automotive refinishing. On the one hand, in this segment particularly, a reduction in the number of individual coats to be applied is an advantage, allowing the refinish operation to be conducted more rapidly and economically. On the other hand, especially with refinishing, where regions with locally damaged original finish are surrounded by intact zones of the original finish, the adhesion achieved is often inadequate. This is especially the case if any residues of the original finish, along with the corrosion products that have usually already developed, must be removed from the damaged site by cleaning and abrading, and the substrate surface is exposed as a result. The adhesion problems arise not least from the different interfaces. First, here, there is the interface between the refinish and the exposed substrate. Moreover, the newly applied finish must also adhere to the corresponding interfaces and boundary edges in the region between the damaged, cleaned, and abraded areas and also the regions with intact original finish that surround these areas. At all of these interfaces, a single coating composition must ensure adequate adhesion. The provision of a direct-to-metal primer composition which can be used in refinishing and which affords appropriate corrosion protection is therefore an even greater challenge.

Coating compositions with which attempts are made to counter the stated problems, especially in respect of deficient adhesion and deficient corrosion protection in connection with the direct-to-metal primer coats described, are described in patent application US2006/0047085, for example. The coating compositions described therein lead to acceptable corrosion resistance and weathering resistance, but contain relatively large quantities of organic solvents.

Nowadays, however, specific upper limits on emissions of volatile organic constituents, especially solvents, are laid down by law for the operation of industrial painting plants. Moreover, compliance with the statutory stipulations must be adequately demonstrated (cf., for example, the 31st German Federal Airborne Pollutants Ordinance, and also the corresponding VOC Guidelines and VOC Ordinances of the EU). Particularly as part of what is called simplified reduction plan, developed specifically for painting plants in the lower size segment (automotive refinish, for example), it can be assumed that the statutory approval for the operation of such plants would in future be achievable through the use of coating compositions having a VOC of less than 250 g/l. For coating compositions in the form in which they have been formulated ready for use, the VOC is defined as follows: VOC (g/l)=(mass of volatiles (g)−mass of water (g))/(volume of coating material (l)−volume of water (l)). Volatiles here are those compounds which at processing temperature, more particularly 20° C., exceed a vapor pressure of 10 pascals. They include, in particular, the commonly known organic solvents, examples being the organic solvents specified later on below, and also water. Coating compositions which in the ready-to-process state have a low VOC level of this kind in general have only a small amount of organic solvents and, moreover, a high fraction of water in comparison to the organic solvents.

SUMMARY

One aspect of the invention pertains to an aqueous two-component primer composition comprising (1) a paint base component comprising (A) at least one polyurethane resin having an OH number of 5 to 80 mg KOH/g, (B) zinc phosphate, (C) at least one pigment, and (2) a curing component comprising (D1) at least one polyisocyanate which is an isocyanurate based on hexamethylene diisocyanate, (D2) at least one polyisocyanate which is a polyether-modified isocyanurate based on isophorone diisocyanate, where the stoichiometric ratio of isocyanate groups in the curing component to the complementary hydroxyl groups in the paint base component is greater than 2.

Another aspect of the invention pertains to a method for producing a coating by (1) applying a primer composition described herein directly to a metallic substrate, and (2) forming a polymer film from the primer composition applied in stage (1). A third aspect pertains to a coated substrate coated the methods described herein.

DETAILED DESCRIPTION

An aspect of the present invention provides an aqueous primer composition which no longer has the disadvantages of the prior art, but which instead, as part of the finishing of metallic substrates, can be applied directly to the substrate and which, as a coating, exhibits outstanding adhesion and also corrosion resistance, especially under weathering effects such as moisture. The coating produced with the primer composition should be directly recoatable with conventional basecoat materials, of the kind used more particularly in the automobile industry, and hence a coat system should be possible that is substantially less complex by comparison with the conventional automotive finishes. In spite of this, the exacting requirements imposed on multicoat automotive finishes, and particularly the good corrosion protection, ought to be fulfilled entirely. Furthermore, the primer composition ought to be aqueous and to include as small as possible a fraction of volatile organic substances such as solvents, so as to meet the growing statutory requirements in relation to eco-friendliness. More particularly, the primer composition ought to be able to be produced in such a way that it comes in at below the VOC limit of 250 g/l in its service state. The primer composition and the method for direct coating of metallic substrates using the primer composition ought in particular to be amenable to use in automotive refinish.

Accordingly, one aspect of the invention provides a new, aqueous two-component primer composition comprising
(1) a paint base component comprising
  (A) at least one polyurethane resin having an OH number of 5 to 60 mg KOH/g,
  (B) zinc phosphate,
  (C) at least one pigment,
  and
(2) a curing component comprising
  (D1) at least one polyisocyanate which is an isocyanurate based on hexamethylene diisocyanate,
  (D2) at least one polyisocyanate which is a polyether-modified isocyanurate based on isophorone diisocyanate,
where the stoichiometric ratio of isocyanate groups in the curing component to the complementary hydroxyl groups in the paint base component is greater than 2.

The new primer composition is referred to below as the primer composition of the invention. It can be applied directly to various metallic substrates, and the coatings produced in this way exhibit outstanding adhesion and also corrosion resistance. Accordingly, the present invention provides not only the primer composition but also a method for producing a coating on a substrate by applying the primer composition of the invention directly to the substrate. Where the primer composition of the invention, or a coating produced therefrom directly on a substrate, is part of a multicoat coating system, there is no need for either a conversion coat or a primer-surfacer coat in this multicoat coating system, with no consequent deleterious effect on the performance properties. On the contrary: these properties, especially the adhesion of the overall coating to be substrate, and the corrosion protection, are outstanding. It has proven possible, surprisingly, to achieve these outstanding properties despite the primer composition being aqueous and being easily produced such that the VOC is below the VOC limit of 250 g/l. Success is therefore achieved in combining outstanding performance properties with an environmentally valuable profile.

Measurement Methods

For the purposes of the invention, the hydroxyl number (OH number) indicates the amount of potassium hydroxide in milligrams which is equivalent to the molar amount of acetic acid bonded in the acetylation of one gram of the constituent in question. The hydroxyl number in the context of the present invention is determined experimentally by titration in accordance with DIN 53240-2 (Determination of hydroxyl value—Part 2: Method with catalyst) unless otherwise indicated.

For the purposes of the invention, the acid number indicates the amount of potassium hydroxide in milligrams which is needed to neutralize 1 g of the constituent in question. For the purposes of the present invention, the acid number is determined experimentally by titration in accordance with DIN EN ISO 2114 unless otherwise indicated.

For the purposes of the present invention, the mass-average ($M_w$) and number-average ($M_n$) molecular weights are determined by means of gel permeation chromatography at 40° C. by using a high-performance liquid chromatography pump and a refractive index detector. The eluent used was tetrahydrofuran, with an elution rate of 1 ml/min. Calibration is carried out using a polystyrene standard.

The isocyanate content in the context of the present invention is determined in accordance with DIN EN ISO 11909, by reaction of the respective sample with excess dibutylamine and back-titration of the excess with hydrochloric acid against bromophenol blue.

For the purposes of the present invention, the nonvolatiles content (nvc, solids) was determined under conditions selected to be constant in each case, unless otherwise indicated. The nonvolatiles content is determined by heating an amount of 2 g of the constituent in question, such as a dispersion of a polymer or resin in appropriate solvents, for example, at 125° C. for 2 hours, cooling to 20° C., and then weighing the residual amount (cf. also ISO 3251). The nonvolatiles content of corresponding dispersions of polymers or resins which are used in the primer composition of the invention is determined, for example, in order thereby to be able to adjust and determine, for example, the weight fraction of the respective constituent in a mixture of two or more constituents, or of the primer composition as a whole.

Primer Composition

The primer composition of the invention is a multicomponent, more particularly a two-component (2K), coating material composition.

This means that in the context of the present invention the component (1) as described below (paint base component) and the component (2) as described below (curing component) are prepared and stored separately from one another and are not combined until shortly before application. The processing life (in other words the time within which the primer composition of the invention can be processed at room temperature (15 to 25° C., more particularly 20° C.) without corresponding crosslinking reactions, at room temperature, for example, causing such a sharp increase in viscosity that the application is no longer possible) is of course dependent on the constituents used, and more particularly on the polyurethane resins (A) and polyisocyanates (C1) and (C2) that are described later on below. The processing life of the primer composition is, however, more particularly at least 5 minutes up to 60 minutes, preferably at least 15 minutes up to 60 minutes.

The primer composition of the invention may in particular be thermally curable. In the context of the present invention, "thermally curable" or the term "thermal curing" denotes the crosslinking of a paint coat (formation of a coating film) that takes place as a result of chemical reaction of reactive functional groups, the energetic activation of this chemical reaction being possible by means of thermal energy. It may be the case here that different, complementary functional groups react with one another, and/or that film formation derives from the reaction of autoreactive groups, in other words functional groups which react together with groups of their own kind. Examples of suitable complementary reactive functional groups and autoreactive functional groups are known from German patent application DE 199 30 665 A1, page 7, line 28, to page 9, line 24, for example. Particularly noteworthy as complementary functional groups are hydroxyl groups and isocyanate groups.

This crosslinking may be self-crosslinking and/or external crosslinking. Where, for example, the complementary reactive functional groups are already present in an organic polymer which is used as binder, the form of crosslinking present is self-crosslinking. External crosslinking is present, for example, if an organic polymer containing particular functional groups reacts with a different, possibly likewise polymer, crosslinking agent, the crosslinking agent in that case containing reactive functional groups which are complementary to the reactive functional groups present in the organic polymer used. It is also possible for an organic polymer binder to have not only self-crosslinking but also externally crosslinking functional groups, and to then be combined with crosslinking agents.

Since it comprises the polyisocyanates (C1) and (C2) and a hydroxy-functional polyurethane resin (A) as described later on below, the primer composition of the invention is at least partly externally crosslinking and hence at least partly thermally curable. In general, however, following application to a substrate, the primer composition also undergoes partial physical curing, or is partially physically curable. In the context of the present invention, "physically curable" or the term "physical curing" denotes the formation of a film by loss of solvent from polymer solutions or polymer dispersions. Again, it is not impossible that further polymers, such as self-crosslinking polymers, for example, may be present and hence that the primer composition may in part also be cured, or curable, thermally with self-crosslinking.

Constituents of Component (1) (Paint Base Component)
Polyurethane Resin (A)

The first essential constituent of the paint base component of the coating composition of the invention is at least one polyurethane resin (A) as defined below.

Polyurethane resins, their preparation and use in coating compositions are known to the skilled person. They are prepared generally by reaction of polyisocyanates known per se with polyols that are likewise known, it also being possible in each case, of course, to use monofunctional compounds, especially monoalcohols. Furthermore, polyurethane resins may be hydrophilically stabilized ionically and/or nonionically.

Polyurethane resins, their preparation and use in coating materials are described for example in European patent EP 0521 928 B1, page 2, line 57, to page 8, line 16,
German patent application DE 199 14 055 A1, page 2, line 24, to page 4, line 16
European patent application EP 0 228 003 A1, page 3, line 24, to page 5, line 40,
European patent application EP 0 634 431 A1, page 3, line 38, to page 8, line 9, or
International patent application WO 92/15405, page 2, line 35, to page 10, line 32, or else
German patent application DE 3545618 A1, column 6, line 39, to column 9, line 66.

The polyurethane resin (A) is prepared using, for example, the organic polyisocyanates that are known per se to the skilled person, namely the known aliphatic, cycloaliphatic, aliphatic-cycloaliphatic, aromatic, aliphatic-aromatic and/or cycloaliphatic-aromatic polyisocyanates.

Examples of suitable diisocyanates are isophorone diisocyanate, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, or diisocyanates derived from dimer fatty acids, of the kind described in patent WO 97/49747, for example, such as for example 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane; tolylene diisocyanate, xylylene diisocyanate, bisphenylene diisocyanate, naphthylene diisocyanate or diphenylmethane diisocyanate. Examples of suitable polyisocyanates are also the isocyanurates of the above-described diisocyanates.

Examples of suitable monoisocyanates which can be used in preparing the polyurethane resin (A) are phenyl isocyanate, cyclohexyl isocyanate or stearyl isocyanate.

Polyols used for preparing the polyurethane resins (A) are, for example, the saturated and unsaturated polyols of relatively high molecular mass and of low molecular mass that are known to the skilled person, for example, and also, optionally, monoalcohols, in minor amounts. Low molecular mass polyols used are more particularly monomeric diols and, in minor amounts, monomeric triols for the purpose of introducing branches.

Examples of suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexane-dimethanol, trimethylpentanediol, ethylbutylpropanediol, or the positionally isomeric diethyloctanediols.

Examples of suitable triols are trimethylolethane, trimethylolpropane, or glycerol.

Examples of suitable monoalcohols are ethanol, propanol, n-butanol, sec-butanol, tert-butanol, amyl alcohols, hexanols, fatty alcohols, allyl alcohol, or phenol.

Examples of suitable polyols of relatively high molecular mass are saturated or olefinically unsaturated polyether polyols and/or polyester polyols, more particularly polyester polyols, examples being those having number-average molecular weights of 400 to 5000 g/mol. The polyester polyols can be prepared, for example, using the abovementioned low molecular mass polyols, and also using corresponding polycarboxylic acids.

Suitable polycarboxylic acids are the organic polycarboxylic acids that are known per se, these being, for example, aromatic, aliphatic, and cycloaliphatic polycarboxylic acids.

Examples of suitable aliphatic polycarboxylic acids are oxalic acid, malonic acid, succinic acid, glutaric acid, adipic acid, pimelic acid, suberic acid, azelaic acid, sebacic acid, undecanedicarboxylic acid, dodecanedicarboxylic acid, dimer fatty acids, or maleic acid, fumaric acid, or itaconic acid.

Examples of suitable cycloaliphatic polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexa-hydrophthalic acid, tricyclodecanedicarboxylic acid, tetrahydrophthalic acid, or 4-methyltetrahydrophthalic acid.

Examples of suitable aromatic polycarboxylic acids are phthalic acid, isophthalic acid, terephthalic acid, or else halophthalic acids.

It is of course also possible to make use, for example, of corresponding anhydrides of polycarboxylic acids, an example being hexahydrophthalic anhydride. Also possible, of course, is the use of monocarboxylic acids that are known per se, such as benzoic acid, tert-butylbenzoic acid, lauric acid, isononanoic acid, fatty acids of naturally occurring oils, or crotonic acid.

For the purpose of hydrophilic stabilization and/or of increasing the dispersibility in an aqueous medium, polyurethane resins, an example being the polyurethane resin (A), generally comprise certain ionically and/or nonionically modifying groups, preferably ionic groups. More specifically these groups are alternatively functional groups which can be converted into cations by neutralizing agents and/or quaternizing agents (potentially cationic groups), and/or cationic groups (cationic modification)

or functional groups which can be converted into anions by neutralizing agents (potentially anionic groups), and/or anionic groups (anionic modification), and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted into cations by neutralizing agents and/or quaternizing agents). Additionally noteworthy are the cationic groups that are prepared from the aforementioned functional groups using neutralizing agents and/or quaternizing agents that are known to the skilled person, such as primary, secondary, tertiary and/or quaternary ammonium groups, tertiary sulfonium groups and/or quaternary phosphonium groups, more particularly quaternary ammonium groups and tertiary sulfonium groups.

Examples of the functional groups for anionic modification are, as is known, carboxylic, sulfonic and/or phosphonic acid groups, more particularly carboxylic acid groups (functional groups which can be converted into anions by neutralizing agents) and also anions prepared from the aforementioned functional groups using neutralizing agents that are known to the skilled person, such as carboxylate, sulfonate and/or phosphonate groups, more particularly carboxylate groups.

The functional groups for nonionic hydrophilic modification are preferably poly(oxyalkylene) groups, more particularly poly(oxyethylene) groups.

The hydrophilic modifications may be introduced into the polyurethane resin (A) by means, for example, of corresponding monomers which contain the (potentially) ionic groups. The nonionic modifications are introduced, for example, through the incorporation of poly(ethylene) polymers, as lateral or terminal groups of the polyurethane molecules. The hydrophilic modifications are introduced, for example, by way of compounds which contain at least one group that is reactive toward isocyanate groups, preferably at least one hydroxyl group. To introduce the ionic modification it is possible to use monomers which as well as the modifying groups contain at least two hydroxyl groups. It is also possible, for example, for the preferred carboxylic acid and/or carboxylate groups to be introduced at least partially by the abovementioned polyester polyols which can be used as relatively high molecular mass polyols in the preparation of the polyurethane resins (A). For introducing the nonionic modifications it is preferred to use the alkoxy poly(oxyalkylene) alcohols and/or polyether diols that are known to the skilled person.

The polyurethane resin (A) is hydroxy-functional. This means more particularly that in the above-described reaction of the corresponding starting compounds, namely the polyisocyanates and polyols, the particular selected starting compounds are reacted with one another in stoichiometries such that the polyurethane resin (A) still contains free hydroxyl groups. At the same time, however, it is likewise essential to the invention that the OH number of the polyurethane resin (A) is not too high. Only in this way are the advantageous effects of the invention achieved.

The polyurethane resin (A) has an OH number of 5 to 60 mg KOH/g, preferably 8 to 50 mg KOH/g, very preferably of 10 to 40 mg KOH/g.

The polyurethane resin (A) preferably contains carboxylic acid and/or carboxylate groups for hydrophilic stabilization. It preferably has an acid number of 5 to 80 mg KOH/g, with more particular preference of 6 to 60 mg KOH/g, very preferably of 10 to 40 mg KOH/g.

The polyurethane resin (A) preferably has a number-average molecular weight $M_n$ of 3000 to 30 000 g/mol, more particularly of 4000 to 25 000 g/mol, very preferably of 5000 to 20 000 g/mol.

The polyurethane resin (A) preferably has a weight-average molecular weight $M_w$ of 10 000 to 100 000 g/mol, more particularly of 20 000 to 80 000 g/mol, very preferably of 30 000 to 60 000 g/mol.

The polyurethane resin (A) is prepared in accordance with the customary techniques of polymer chemistry. This means more particularly the polymerization of polyisocyanates and polyols to form polyurethanes. These techniques are known to the skilled person and can be adapted individually according to the case in hand. Exemplary preparation processes and reaction conditions can be found, for example, in European patent EP 0521 928 B1, page 2, line 57, to page 8, line 16.

It is preferred to use polyurethane resins which have been prepared by the known techniques in organic solvents and have then been converted into an aqueous dispersion by corresponding addition of water and distillative removal of the organic solvent. As is known, the resulting dispersions are also called secondary dispersions.

The fraction of the at least one polyurethane resin (A) is preferably 5% to 40% by weight, more particularly 6% to 30% by weight, very preferably 7% to 20% by weight, based in each case on the total amount of the primer composition of the invention.

Zinc Phosphate (B)

A further essential constituent of the paint base component of the coating composition of the invention is zinc phosphate. The zinc phosphate is used preferably in at least partially hydrated forms, in other words not in the form of exclusively anhydrous (dehydrated) zinc phosphate, but instead with fractions of the known zinc phosphate hydrates, namely the mono-, di-, and tetrahydrate or mixtures of these. Such products are available commercially as white, powdered solids (an example being zinc phosphate ZP 10 from Heubach). These products are known to the skilled person and can readily be used in the coating composition of the invention. The average particle size of the zinc phosphate used is not per se a critical parameter and is situated for example within the ranges, common for fillers and pigments, of a few micrometers (more particularly an average particle size ($d_{50}$) of 0.1 to 100 μm, preferably 0.1 to 50 μm, as measured by means of laser diffraction in accordance with ISO 13320:2009). Zinc phosphate and/or its hydrates are used more particularly in the form of powders with particle sizes of lower than 100 μm, more particularly lower than 50 μm, very preferably lower than 35 μm. These particle sizes are ascertained by determining the sieve residue in accordance with DIN 53195:1990-09. Where, in the case of a sample for which the sieve residue has been measured using a sieve of defined mesh size, there remains a sieve residue of less than 0.1% by weight, that sample is considered for the purposes of the present invention to be a powder with particle sizes lower than the mesh size of the respective sieve.

The fraction of the zinc phosphate (B1) is preferably 2% to 30% by weight, more particularly 3% to 20% by weight, very preferably 4% to 15% by weight, based in each case on the total amount of the primer composition of the invention.

Pigment (C)

The primer composition of the invention further comprises at least one pigment (C). Such pigments are known to the skilled person and are described for example in Römpp-Lexikon Lacke and Druckfarben, Georg Thieme Verlag, Stuttgart, N.Y., 1998, pages 176 and 451. Explicitly excluded from the coloring pigments (C) are zinc phosphate and its hydrates (B) and also the fillers (E) described later on below. The pigments present are more particularly black pigments and/or white pigments. Preferably, therefore, the primer composition comprises at least one black pigment or at least one white pigment, or at least one white pigment and one black pigment. This means that the primer composition of the invention preferably has a black, white, or (in various gradations) gray color. While a black or white color can be achieved with the exclusive or almost exclusive (advantageously more than 95% by weight, based on the total amount of pigment) use of pigments of the color in question, a gray color is obtained, for example, through the use of balanced mass fractions of black pigment and white pigment, with a black to white pigment weight ratio of 1:10 to 10:1, for example, preferably 1:5 to 5:1, depending on the desired gray stage and color strength of the respective pigments.

Preferred black pigments are the typical organic and inorganic, more particularly inorganic, black pigments, of the kind available commercially as powders. Particularly noteworthy are pigment-grade carbon blacks (pigmentary carbon blacks), iron oxide ($Fe_3O_4$) pigments such as the typical synthetic iron oxides (available under the Bayferrox trade name from Lanxess, for example), mixed oxide pigments such as manganese black or spinel black. Especially preferred are pigment-grade carbon blacks (pigmentary carbon blacks) and iron oxide pigments.

Preferred white pigments are the typical inorganic white pigments, such as, for example, titanium dioxide (examples being the rutile pigments known under the trade name Kronos from the company Kronos), zinc oxide, zinc sulfide or antimony trioxide. Especially preferred is titanium dioxide, more particularly in its rutile modification.

The particle size of the pigments used that are available commercially in powder form, for example, is not per se a critical parameter, and is situated, for example, within the ranges, common for fillers and pigments, of a few micrometers (more particularly an average particle size ($d_{50}$) of 0.1 to 100 μm, preferably 0.1 to 50 μm, as measured by means of laser diffraction in accordance with ISO 13320:2009). Used more particularly as pigments are the commercially available powders with particle sizes lower than 100 μm, more particularly lower than 50 μm (determination of the sieve residue in accordance with DIN 53195:1990-09; see above).

The fraction of the pigments may vary widely and is preferably 0.1% to 20% by weight, more particularly 0.2% to 17.5% by weight, very preferably 0.3% to 15% by weight, based in each case on the total amount of the primer composition of the invention. In the case of white primers, a pigment fraction of 5% to 20% by weight, more particularly 8% to 15% by weight, is preferred. In the case of black primers, a pigment fraction of 0.1% to 5% by weight, more particularly 0.2% to 4% by weight, is preferred.

Constituents of Component (2) (Curing Component)

In accordance with the invention the curing component comprises at least one polyisocyanate (D1) as defined below and at least one polyisocyanate (D2) which is different therefrom and is as defined below.

The polyisocyanates (D1) are isocyanurates based on hexamethylene diisocyanate (more precisely hexamethylene 1,6-diisocyanate, HDI).

As is known, isocyanurates of this kind can be prepared from any of a very wide variety of isocyanates in the presence of certain catalysts, examples being sodium formate, potassium acetate, tertiary amines, or triphenylphosphines. In this case the very stable isocyanurate ring systems are formed, that are robust even at high temperatures of above 100° C., for example, these systems being formed of three isocyanate groups in each case. Each of these three isocyanate groups originates from three different molecules of the respective isocyanate used—that is, trimeric structures are formed. Whereas the use of monoisocyanates in each case produces molecules which are unambiguously defined by the respective chemical structural formula, the reaction in the case of polyisocyanates, such as diisocyanates such as HDI for example, need not proceed in such a uniform way, and results more particularly in more highly crosslinked, so-called isocyanurate polyisocyanates (for example, isocyanurate diisocyanates), or mixtures of different isocyanurate polyisocyanates. These products are therefore isocyanurates with a partly polymeric character which are based on a polyisocyanate, such as a diisocyanate. Depending on the choice of reaction conditions—known per se—and of reaction regime, this means, for example, that an isocyanurate trimer which has already formed may attach further diisocyanates, and that further isocyanurate ring systems may form, with different products, having higher molecular weights, then being produced. At the same time there is a reduction in the average number of isocyanate groups, relative to a monomeric diisocyanate. Whereas this number is precisely 1 in the ideal trimer, consisting of precisely three diisocyanate molecules, this number falls to less than 1 in more highly crosslinked isocyanurate polyisocyanates. It is known to be possible, moreover, for fractions of bridging diols, such as hexanediol, for example, to be added during the preparation process, for the purpose, for example, of adjusting the reactivity of the isocyanurates, and it is also known that, in this way, two or more isocyanurate ring systems may be joined to one another.

The amount of isocyanate groups in polyisocyanates, as for example in isocyanurates of diisocyanates—that is, for example, isocyanurate polyisocyanates of diisocyanates—is, familiarly, generally expressed via the isocyanate content. The isocyanate content is the mass fraction of the free isocyanate groups in polyisocyanates, expressed in percent. For the purposes of the present invention it is determined experimentally as described earlier on above.

Starting from a particular diisocyanate, such as HDI, and then, from this diisocyanate, preparing isocyanurates based on this diisocyanate, by the methods that are known per se and have already been elucidated above, especially isocyanurates with a polymeric character, the isocyanate content reflects the degree of crosslinking of the respective isocyanurate or isocyanurate diisocyanate. The following statement follows directly from what has been described above: The lower the isocyanate content, the higher the crosslinking density. Thus, for example, the theoretical isocyanate content of the purely trimeric isocyanurate based on HDI adopts the maximum value of around 25% (molecular weight 3×NCO=126 g/mol; molecular weight of the purely trimeric isocyanurate of HDI=504.6 g/mol).

The at least one isocyanurate based on HDI (D1) preferably has an isocyanate content of less than 22%, more particularly of 6% to 16%, very preferably of 8% to 13%. Accordingly, the at least one isocyanurate based on HDI (D1) is preferably an isocyanurate having a higher crosslinking density as compared with the pure trimer.

The fraction of the at least one isocyanurate based on HDI (D1) is preferably 1% to 10% by weight, more particularly 1.5% to 7.5% by weight, very preferably 2% to 6% by weight, based in each case on the total amount of the primer composition of the invention.

The HDI-based isocyanurates (D1) described are available commercially, as for example in solvent-free form or as a solution in solvents that are known per se and are described later on below, and can readily be used in the primer composition of the invention. Reference is made, for example, to commercial products from the Desmodur product line, an example being Desmodur N 3800, from Bayer.

The polyisocyanates (D2) are polyether-modified isocyanurates based on isophorone diisocyanate (IPDI). For the at least one isocyanurate based on IPDI (D2), the facts which apply in respect of the preparation and possible crosslinking with formation of isocyanurate diisocyanates having a plurality of isocyanurate ring systems per molecule are of course the same as those as already described above for the HDI isocyanurates. A further factor, however, is that the at least one isocyanurate based on IPDI (D2) is polyether-modified.

This means that the isocyanurate contains polyether groups, examples being polyether chains such as, more particularly, polyoxyethylene chains or polyoxypropylene chains. Polyether modification of polyisocyanates and/or isocyanurates in the context of the present invention refers more particularly to modification with alkoxypolyoxyalkylene groups, preferably methoxypolyoxyalkylene groups. The groups in question here are very preferably methoxypolyoxyethylene groups and/or methoxypolyoxypropylene groups.

The hydrophilic modifications can be introduced using, for example, the alkoxypoly(oxyalkylene) alcohols which are known to the skilled person and are also available commercially. This is followed by partial reaction of the isocyanate groups with the polymeric monoalcohols, which has the effect of attaching the polyether modifications—that is, for example, the poly(oxyalkylene) groups—covalently to the isocyanurate through formation of urethane bridges. Also possible here is the formation of allophanate groups, in which case this formation proceeds via an intermediate isocyanate dimerization with subsequent reaction with the alcohol. It can be seen, therefore, that the hydrophilic modification removes isocyanate groups from the system and so leads to a reduction in the isocyanate content, relative to the respective isocyanurate without modification. The underlying reactions of the modification and the reaction conditions to be selected here are known to the skilled person and can be readily adapted to the case in hand. The hydrophilic modifications can be introduced in accordance with the preparation, as described above, of isocyanurates and/or isocyanurate diisocyanates with polymeric character. Also possible, of course, is the simultaneous reaction of the IPDI monomers with alkoxypoly(oxyalkylene) alcohols, in which case the formation of isocyanurates and the linkage between isocyanate groups and alkoxypoly(oxyalkylene) alcohols take place alongside one another.

The fraction of isocyanate groups modified in the isocyanurate (D2) may vary widely and is for example in the range of 1-60 mol %, preferably 2-55 mol %, more preferably 5-50 mol %. The stated molar fraction here refers to those isocyanate groups of the isocyanurate that are free prior to the modification, and hence takes no account, in particular, of the groups bonded in the isocyanurate ring system.

The at least one hydrophilically modified isocyanurate based on IPDI (D2) preferably has an isocyanate content of less than 17%, more particularly of 4% to 14%, very preferably of 7% to 12%.

The fraction of the at least one hydrophilically modified isocyanurate based on IPDI (D2) is preferably 2% to 12.5% by weight, more particularly 3% to 10% by weight, very preferably 4% to 7.5% by weight, based in each case on the total amount of the primer composition of the invention.

The hydrophilically modified isocyanurates based on IPDI (D2) described are available commercially, in the form for example of a solution in solvents that are known per se and are described later on below, and can readily be used in the primer composition of the invention. Reference is made, by way of example, to commercial products from the Bayhydur product line, an example being Bayhydur 401-70, from Bayer.

The combination of the two isocyanurates (D1) and (D2), in accordance with the invention, has the result in particular of a well-weighted balance between technological properties, more particularly anticorrosion properties, and good water dispersibility on the part of the isocyanates. In this way the anticorrosion properties are combined with the aforementioned environmentally valuable profile.

The fraction of the isocyanurates (D2) in the primer composition is preferably greater than the fraction of the isocyanurates (D1).

It is essential to the invention that the molar amount of the isocyanate groups of the isocyanates present in the curing component (defined by the isocyanate content), more particularly of the polyisocyanates (D1) and (D2), is higher than the molar amount of hydroxyl groups which are crosslinkable with these NCO groups and are present in the paint base component (defined by the OH number), more particularly of the OH groups of the polyurethane resins (A). The stoichiometric ratio NCO/OH, more particularly the stoichiometric ratio of the isocyanate groups in the isocyanurates (D1) and (D2) to the hydroxyl groups present in the at least one polyurethane resin (A), is greater than 2, more particularly greater than 2.5, more preferably greater than 3, very preferably 3.5 to 10, even more preferably 4 to 10, and, in one particularly preferred embodiment, 5 to 10.

It has surprisingly emerged that an amount of isocyanate groups that is higher in this way, more particularly an amount of the isocyanate groups of the isocyanurates (D1) and (D2), in comparison to the hydroxyl groups of the paint base component, more particularly of the at least one polyurethane resin (A), leads to particularly advantageous properties in respect of adhesion and corrosion protection.

Further Constituents of the Primer Composition of the Invention

The primer composition of the invention is aqueous. Aqueous is a specification familiar to the skilled person of coating compositions which comprise water as solvent. Aqueous coating compositions (and hence the primer composition) for the purposes of the present invention are identified more particularly as those containing at least 15% by weight of water, preferably at least 25% by weight, more preferably at least 35% by weight of water, based on the total weight of the coating composition. With particular preference, aqueous means that in addition to the stated requirement "at least 15% by weight (or at least 25% or 35% by weight) of water, based on the total weight of the coating composition", a further requirement which must be met is that the fraction of organic solvents in the coating composition is less than 20% by weight, more particularly less than 15% by weight, very preferably less than 10% by weight, based in each case on the total amount of the coating composition.

The solids content of the primer composition is preferably between 20% and 80%, more particularly 30% to 70%, very preferably between 40% to 60%.

The abovementioned ranges and limits relating to the water content and the organic solvents content are more particularly synonymous with the fact that the primer composition can be produced so as to allow a VOC of less than 250 g/l to be achieved or that the primer composition has a VOC of less than 250 g/l (as to the definition of VOC, see above).

As already described above, specific upper emissions limits for volatile organic constituents, more particularly solvents, are nowadays laid down by statute in the context of the operation of industrial painting plants. Moreover, sufficient demonstration must be given of compliance with the statutory provisions. Particularly in the context of the simplified reduction plan, developed especially for painting plants in the lower size segment (automotive refinish, for example), the acquisition of a statutory permit to operate such plants is tied to the use of coating compositions having a VOC of less than 250 g/l. Accordingly, the primer composition of the invention is advantageous not only in relation to the technological properties, such as adhesion and corrosion protection, but also in respect of the increasingly more stringent statutory provisions in the context of environmental protection.

As already indicated, moreover, the primer composition of the invention may comprise at least one organic solvent. Organic solvents are used which do not inhibit the crosslinking of the primer composition and/or enter into any chemical reactions with the other constituents of the primer composition. The skilled worker is therefore able to select suitable solvents easily on the basis of their known solvency and their reactivity. Examples of such solvents are aliphatic and/or aromatic hydrocarbons such as toluene, xylene, solvent naphtha, Solvesso 100, or Hydrosol® (from ARAL), ketones, such as acetone, methyl ethyl ketone, or methyl amyl ketone, esters, such as ethyl acetate, butyl acetate, butylglycol acetate, pentyl acetate, methoxypropyl acetate or ethyl ethoxypropionate, ethers, alcohols, chlorinated hydrocarbons, or mixtures of the aforementioned solvents.

The primer composition of the invention preferably further comprises at least one filler (E). This filler, where present, is present preferably in the paint base component of the primer composition. Fillers (E) which can be used are ultimately all of the organic and inorganic fillers that are known per se and are familiar to the skilled person, preferably inorganic fillers, for coating compositions. Explicitly excluded from the fillers (E) are zinc phosphate and its hydrates (B) and also the coloring pigments (C) described earlier on above. The fillers thus include, more particularly, the substances known to the skilled person that are used, for example, in granular form or in powder form for the purpose of achieving particular physical properties of coating compositions, and which are insoluble in the respective application medium. Such fillers include, more particularly, carbonates such as calcium carbonate or barium carbonate, sulfates such as calcium sulfate and barium sulfate, silicates and phyllosilicates such as talc, pyrophyllite, mica, kaolin, precipitated calcium, aluminum, calcium/aluminum, and sodium/aluminum silicates, and mullite, silicas such as quartz, cristobalite, precipitated silicas, or, more particularly, fumed silicas of the kind obtainable, for example, under the Aerosil trade name (from Evonik), and metal oxides and metal hydroxides such as aluminum hydroxide and magnesium hydroxide, for example.

Especially preferred in the context of the present invention are silicon-based fillers such as silicon dioxide, silicates and phyllosilicates, and also silicas such as, for example, the fumed silicas known per se (Aerosil from Evonik). These silicon-based fillers are then used optionally as a mixture with further fillers such as preferably sulfates, such as barium sulfate, in the primer composition of the invention.

The particle size of the fillers used that are available commercially in powder form, for example, is not per se a critical parameter, and is situated, for example, within the ranges, common for fillers and pigments, of a few micrometers (more particularly an average particle size ($d_{50}$) of 0.1 to 100 μm, preferably 0.1 to 50 μm, as measured by means of laser diffraction in accordance with ISO 13320:2009). Used more particularly as fillers are the commercially available powders with particle sizes lower than 100 μm, more particularly lower than 50 μm (determination of the sieve residue in accordance with DIN 53195:1990-09; see above). However, as the skilled person is aware, particle sizes are substantially smaller in the case, for example, of the stated fumed silicas such as the commercially available Aerosil products. The average particle sizes ($d_{50}$) in that case are situated for example in the range from 1 to 500 nm, more particularly 1 to 100 nm, preferably 5 to 50 nm (determined by means of photon correlation spectroscopy in accordance with DIN ISO 13321, October 2004).

The fraction of the at least one filler (E) is preferably 5% to 45% by weight, more particularly 6% to 35% by weight, very preferably 7% to 25% by weight, based in each case on the total amount of the primer composition of the invention.

Furthermore, the primer composition may also comprise at least one adjuvant. Examples of such adjuvants are salts which can be decomposed thermally without residue or substantially without residue, binders different from the polyurethane resins (A), crosslinking agents different from the polyisocyanates (D1) and (D2), such as melamine resins, reactive diluents, light stabilizers, antioxidants, deaerating agents, emulsifiers, slip additives, polymerization inhibitors, initiators of radical polymerizations, adhesion promoters, flow control agents, film-forming assistants, thickeners, sag control agents (SCAs), flame retardants, corrosion inhibitors, waxes, biocides, and matting agents. They are used in the customary and known amounts.

The solids content of the primer composition of the invention may vary according to the requirements of the case in hand, more particularly within the preferred ranges specified above. The solids content is guided first and foremost by the viscosity that is needed for the application, especially spray application, and so may be set by the skilled person on the basis of their common general knowledge, optionally with the assistance of a few range finding tests.

The Production of the Primer Composition of the Invention

The primer composition of the invention can be produced using the mixing methods and mixing assemblies that are customary and known for the production of coating compositions, such as stirred tanks, agitator mills, extruders, compounders, Ultraturrax devices, in-line dissolvers, static mixers, toothed-wheel dispersers, pressure release nozzles and/or microfluidizers. Here it should be borne in mind that the primer composition of the invention is a 2K coating composition, and that component (1) (paint base component) and component (2) (curing component) are stored separately from one another and, as described above, not combined and mixed until shortly before the application of the primer composition. Here, generally speaking, the paint base component comprises not only the inventively essential constituents (A), (B), (C) and water, but also any adjuvants present. This paint base component is then admixed, shortly prior to the application of the primer composition, with the curing component, which generally comprises organic solvents as well as the inventively essential constituents (D1) and (D2).

In advantageous embodiments of the invention, black and white paint base components are prepared (comprising exclusively or almost exclusively (advantageously more than 95% by weight, based on the total amount of pigment) black pigments or white pigments). These paint base components can then be mixed in any desired proportions with one another, thus producing paint base components in various gray stages in a simple way. It is an advantage of the invention, therefore, that paint base components and hence primer compositions in different achromatic lightness stages can be produced in a simple way. In this way the primer composition can then be optimally tailored in terms of its lightness to any further coloring coating compositions, to be applied after the primer composition and described later on below, more particularly basecoat materials, with the resulting multicoat system then having, as a result, excellent coloring and depth of color.

The Method of the Invention

The present invention additionally provides a method for producing a coating on a substrate by applying the coating composition of the invention directly to a substrate and then forming a coating film. In the context of the method of the invention in which the primer composition is used, of course, the particular and preferred embodiments described above for the primer composition likewise apply.

Applying directly means that, prior to the application of the primer composition, no other coating composition is applied that is capable of forming an organic polymeric matrix, and no conventional conversion coating composition (in the form of phosphating, for example) is applied. The anticorrosion primer composition is therefore the first applied coating composition. More particularly, no electrocoat layers are applied.

Application of the primer composition of the invention to a substrate may take place in the film thicknesses that are customary within the vehicle industry, in the range, for example, of 5 to 200 micrometers, preferably 10 to 100 micrometers, more preferably 20 to 60 micrometers, very preferably 30 to 50 micrometers. The film thicknesses indicated should be understood as dry film thicknesses after the curing described below. The techniques employed in this context are, for example, the known techniques such as spraying, knifecoating, spreading, pouring, dipping, impregnating, trickling, or rolling. Spraying techniques are employed with preference.

After the primer composition of the invention has been applied, a polymer film or coating film is formed from it. That is, the applied primer composition is cured by known techniques. Curing takes place preferably at temperatures of 10 to 200° C., more particularly 10 to 100° C., very preferably of 20 to 80° C. These preferred, fairly low curing temperatures are a consequence in particular of the fact that the primer composition is a 2K coating composition for which only low curing temperatures are necessary, particularly for the thermal external crosslinking of the hydroxyl groups of the polyurethane resin (A) and of the isocyanate groups of the polyisocyanates (D1) and (D2). The duration of curing may vary greatly from one case to another, and is situated for example at between 1 minute and several hours, more particularly between 5 minutes and 120 minutes.

Depending on the case in hand, curing may optionally be preceded by flashing at, for example, room temperature (about 15 to 25° C.) for 1 to 60 minutes, for example. Flashing for the purposes of the present invention means the evaporation of organic solvents and/or water, rendering the coating material dry but not yet cured—in particular, no fully crosslinked coating film is formed at this point.

Curing then produces the coated substrate of the invention, which is likewise provided by the present invention. The present invention also provides a coating produced from the primer composition.

After the primer composition has been cured, further customary and known coating compositions capable of forming a coating layer based on a polymeric matrix may be applied and cured by customary and known techniques, to produce a multicoat system. The associated dry film thicknesses of the respective individual coats are within the usual ranges—for example, between 5 to 200 micrometers, more particularly between 5 and 100 micrometers. These coats may be produced by successive application of the individual coats, without complete curing in each case, followed by curing in a concluding, joint curing process (wet-on-wet process). The individual complete curing of the coats in each case is of course also possible.

In one particularly preferred embodiment of the present invention, a multicoat coating is produced on a substrate by applying the further coating compositions prior to the complete curing of the primer composition. This means that the primer composition is merely flashed off beforehand (wet-on-wet process). In particular, the coats that then follow are applied likewise by the wet-on-wet process, and so, after application and optional flashing of the last coating composition, all of the applied coating compositions, including the primer composition, are cured.

In the automotive industry, where the primer composition of the invention is preferably employed, the further coating compositions may be, as is known, customary primer-surfacer coats, basecoats, and clearcoats. With very particular preference, however, the system in question is a multicoat coating system which comprises the primer composition of the invention, a basecoat, and a clearcoat, and which more particularly is constructed of these three coats. This multicoat coating system, which in contrast to the usual multicoat automotive coating (comprising a conversion coat, electrocoat, primer-surfacer coat, basecoat, and clearcoat) consists of only three individual coats, nevertheless has outstanding performance properties, especially with regard to resistance to condensation and salt water. The primer composition of the invention, accordingly, unites the performance properties of conversion coat (especially in the form of phosphating), electrocoat, and primer-surfacer coat in one, and hence affords great advantages.

The substrates used are metallic substrates, preferably those as employed in the context of the automotive industry (vehicle construction). It is advantageous to use alloyed and unalloyed steels and/or iron, zinc, and aluminum substrates, and corresponding alloys.

In one particular embodiment of the present invention, the substrates in question are metallic substrates that have already been fully painted, more particularly with multicoat automotive finishes, and where the respective multiple coating exhibits local instances of damage. More particularly, therefore, it comprises automobile bodies or parts thereof which have instances of damage such as stonechip damage and the like, for example. Within the damaged regions, therefore, the original multicoat coating has suffered at least partial detachment as a result of external exposure. The primer composition of the invention is then used in repairing these damaged regions, in other words in refinishing. Generally speaking, in the refinishing procedure, the application of the primer composition is preceded by cleaning and abrading of the damaged, originally coated substrate. In this procedure, any regions of the original coating present that are not sufficiently adhering and have undergone partial detachment, and/or corrosion products that have already formed, are removed, and more particularly the metallic substrate is locally exposed. Accordingly, the method of the invention as well, which involves applying the primer composition directly to the substrate, is used advantageously in the context of refinishing, more particularly automotive refinishing. In the context of refinishing more particularly, the primer composition of the invention and also the method of the invention afford great advantages, since specifically in this demanding sector, the reduction in the number of coats requiring individual application for the purpose of repairing the multicoat coating system massively facilitates the work and makes it more rapid to carry out and hence more favorable from an economic standpoint. A particular advantage in this context is also the fact that the primer composition can be applied wet-on-wet and hence there is no need for interim abrading of the layer, as would be the case in the event of full curing prior to the application of further coating compositions. The primer composition of the invention and the method of the invention lead to coatings which exhibit outstanding adhesion and also corrosion resistance. The present invention also provides, accordingly, for the use of the primer composition and also of the method for increasing the corrosion resistance, especially in the context of automotive finishing.

In the text below, the invention is illustrated using examples.

Examples

A) Preparation of Inventive Primer Compositions (1) and (2)

The components (1) (paint base component) and (2) (curing component) of a white inventive primer composition and of a black inventive primer composition were prepared by combining the respective constituents and subjecting them to intimate mixing in a dissolver. The constituents and their amounts can be seen in tables 1 and 2. Whereas the paint base components of the two inventive primer compositions differ from one another, the curing component selected in each case was the composition indicated in table 2.

TABLE 1

Components (1) (paint base components)

| Constituents | white [parts by weight] | black [parts by weight] |
|---|---|---|
| Polyurethane resin[1] | 12.83 | 14.0 |
| Aliphatic urethane-acrylic hybrid polymer (Daotan VTW 6462/36WA, dispersion in water, solids content 36%; OH number (polyurethane resin) 36 mg KOH/g) | 6.0 | |
| Dimethylethanolamine | 0.37 | 0.41 |
| Sodium nitrite, technical grade | 0.02 | 0.02 |
| Zinc phosphate ZP 10 | 11.0 | 11.0 |
| Commercial passivator (containing octanephosphonic acid) | | 0.15 |
| Commercial nonionic thickener | 0.20 | 0.26 |
| Commercial anionic wetting agent/dispersant | | 0.90 |
| Commercial wetting agent/foam inhibitor | 2.0 | 1.0 |
| Commercial wetting agent | 0.10 | 0.10 |
| Hydrophobic fumed silica (Aerosil R 972) | 0.50 | |
| Hydrophilic fumed silica (Aerosil 380) | | 0.30 |
| Talc (talcum IT extra micro) | 3.30 | 3.0 |
| Aluminum silicate (ASP 600) | 4.0 | 6.0 |
| Commercial filler based on silica/kaolinite (Sillitin N85) | 2.40 | 8.0 |
| Silicon dioxide (Novacite L-207A) | 2.0 | 2.0 |
| Synthetic BaSO$_4$ (Blanc fixe super F) | | 5.0 |
| Titanium dioxide (Titanium rutile 2310) | 12.2 | |
| Black pigment (Bayferrox 316) | 0.03 | |
| Pigmentary carbon black (Farbruβ FW2) | | 0.75 |
| Polypropylene glycol | 2.57 | 2.80 |
| Butyl glycol | 2.0 | 2.0 |
| Water | 38.48 | 42.31 |
| Total | 100 | 100 |

[1]Parameters: OH number (resin) = 17 mg KOH/g, acid number (resin) = 25 mg KOH/g, $M_n$ (resin) = 7800 g/mol, $M_w$ (resin) = 49 000 g/mol.

TABLE 2

Component (2) (curing component)

| | [parts by weight] |
|---|---|
| Polyether-modified polyisocyanurate (D2) based on IPDI, in a 1:1 mixture of 1-methoxypropyl acetate/xylene, solids content 70%, isocyanate content (polyisocyanurate) = 9.5 (Bayhydur 401-70) | 57.70 |
| Polyisocyanurate (D1) based on HDI (solvent-free), isocyanate content (polyisocyanurate) = 11.0 (Desmodur N 3800) | 22.30 |
| Solvesso 200 | 10 |
| Butyl glycol acetate | 10 |
| Total | 100 |

For the preparation of the inventive primer compositions (1) (white) and (2) (black), the paint base components (white) and (black) were in each case mixed with the curing component and also with water in a dissolver. The mixing ratios can be seen in table 3. The stoichiometric NCO/OH ratios of the isocyanate groups in the isocyanurates (D1) and (D2) and also of the hydroxyl groups present in the at least one polyurethane resin (A) in the inventive primer compositions are 6.5 (primer composition (1) (white)) and 8.2 (primer composition (2) (black)). Within an hour after their preparation, the primer compositions were used as described under B)—in other words, applied directly to a metallic substrate, and subsequently cured, in the production of multicoat coating systems.

TABLE 3

Mixing ratios for preparing the primer compositions (1) and (2)

| Constituent | White (1) [parts by weight] | Black (2) [parts by weight] |
|---|---|---|
| Paint base component (white) | 100 | — |
| Paint base component (black) | — | 100 |
| Curing component | 23 | 23 |
| Water | 16 | 22 |

B) Production of Inventive Multicoat Coating Systems (M1) and (M2) by the Inventive Method The primer compositions (1) and (2) described under A) were pneumatically applied directly to iron panels and aluminum panels and also to galvanized steel panels. Prior to the application, these panels were merely cleaned or degreased and subsequently abraded with abrasive paper. More particularly there was no conversion coat (phosphating, for example) and/or electrocoat produced. Application was followed by flashing at room temperature (RT) for 30 minutes, after which a commercial 2K aqueous basecoat material was applied pneumatically and flashed again at RT for 15 minutes. This was followed by the pneumatic application of a commercial 2K clearcoat material, and again by flashing at RT for 5 minutes, and finally by the joint curing of the coat system at 60° C. for 30 minutes. The associated dry film thicknesses of the individual coats of the multicoat coating systems (M1) (white) and (M2) (black) thus produced were 40 micrometers (primer composition (1) for multicoat coating system (M1), primer composition (2) for multicoat coating system (M2)), 12 micrometers (basecoat), and 40 micrometers (clearcoat).

C) Production of Further Multicoat Coating Systems

In addition, various further inventive and comparative (noninventive) multicoat coating systems were produced. Production took place along the lines of the production method described under B), using different primer compositions. The further multicoat coating systems are illustrated below, with the changes in comparison to the multicoat coating systems (M1) and (M2) being indicated. These changes relate in particular to the primer composition used in their production, and hence lead to an alteration in the resultant multicoat coating system.

(M3): The inventive multicoat coating system (M3) was produced in the same way as for the production of (M2), but the stoichiometric NCO/OH ratio of the isocyanate groups in the isocyanurates (D1) and (D2) to the hydroxyl groups present in the polyurethane resin (A) in the primer composition of the invention was 5.3. The smaller fraction of the isocyanurates in this case was compensated by a corresponding amount of Solvesso 200/butylglycol acetate 1:1 (v/v).

(M4): The inventive multicoat coating system (M4) was produced in the same way as for the production of (M2), but the stoichiometric NCO/OH ratio of the isocyanate groups in the isocyanurates (D1) and (D2) to the hydroxyl groups present in the polyurethane resin (A) in the primer composition of the invention was 4.1. The smaller fraction of the isocyanurates in this case was compensated by a corresponding amount of Solvesso 200/butylglycol acetate 1:1 (v/v).

(CM1): The comparative multicoat coating system (CM1) was produced in the same way as for the production of (M2), but using, instead of an inventive primer composition, a primer composition in which the stoichiometric NCO/OH ratio of the isocyanate groups in the isocyanurates (D1) and (D2) to the hydroxyl groups present in the polyurethane resin (A) in the primer composition was 1.8. The smaller fraction of the isocyanurates in this case was compensated by a corresponding amount of Solvesso 200/butylglycol acetate 1:1 (v/v).

(CM2): The comparative multicoat coating system (CM2) was produced in the same way as for the production of (M2), but using, instead of the inventive primer composition, a solvent-based standard primer composition based on polyvinylbutyral/phosphoric acid (for producing a priming coat on the substrate) and a solvent-based standard primer based on polyurethane (for producing a primer coat on the priming coat and beneath the basecoat).

(CM3): The comparative multicoat coating system (CM3) was produced in the same way as for the production of (M2), but using, instead of an inventive primer composition, a primer composition which contained only a polyisocyanurate (D2) (Bayhydur 401-70), and no polyisocyanurate (D1) (Desmodur N 3800). The NCO/OH ratio, however, was kept constant by means of a correspondingly higher fraction of the Bayhydur 401-70. The altered overall amount of the isocyanurate used was compensated by a correspondingly smaller amount of Solvesso 200/butylglycol acetate 1:1 (v/v).

(CM4): The comparative multicoat coating system (CM4) was produced in the same way as for the production of (M2), but using, instead of an inventive primer composition, a primer composition which contained only the polyisocyanurate (D1) (Desmodur N 3800), and no polyisocyanurate (D2) (Bayhydur 401-70). The NCO/OH ratio, however, was kept constant by means of a correspondingly higher fraction of the Desmodur N 3800. The altered overall amount of the isocyanurate used was compensated by a correspondingly larger amount of Solvesso 200/butylglycol acetate 1:1 (v/v). Because of an impaired dispersibility in water, the primer composition produced in this way could not be obtained in such a homogeneous phase as was the case for the primer compositions comprising both polyisocyanurates. Following application and curing, the coating film exhibited an inhomogeneous structure. Accordingly, performance investigations were not carried out.

D) Investigation of the Coatings Produced

The multicoat coating systems (M1), (M2), (M3) and (M4) and also (CM1), (CM2), and (CM3), were subjected to performance investigations for their adhesion properties and for the associated corrosion resistance.

For this purpose, substrates coated with the multicoat coating systems were first stored for 10 days under humid conditions (ISO 6270) (condensation test).

The multicoat coating systems were thereafter inspected for any blistering that may have occurred. Furthermore, the adhesion was investigated by means of the cross-cut test (DIN EN ISO 2409). Likewise carried out was the cross-hatching test, which is similar to the cross-cut test but in which only one cross cut is made in the coated surface, using a cutting blade (respective cut length 5 cm). An adhesive tape is then applied to the surface and subsequently removed again by sudden pulling.

The basis for the results of these tests were the following evaluation scales, which allow corresponding conclusions about the adhesion and corrosion protection properties.

Blistering Test:
m0 to m5 (amount of blisters, where 0=no blisters, 5=very large number of blisters);
g0 to g5 (size of the blisters, where 0=very small or no blisters, 5=very large blisters).

Cross-Cut:
GT0 to GT5, where GT0=completely smooth cut edges and no delaminations, GT5=very severe fragmentations and delaminations at the cut edges, detachment of whole areas.

Cross Hatch:
0 to 5, where 0=completely smooth cut edges and no delaminations, 5=very severe fragmentations and delaminations at the cut edges, detachment of whole areas.

Furthermore, iron substrates coated with multicoat coating systems (M1), (M2), (M3), and (M4), and also (CM1), (CM2), and (CM3), were investigated by salt spray testing in accordance with DIN EN ISO 9227.

Table 4 shows the results obtained.

TABLE 4

Results of the investigation of performance properties a) Iron substrate

|  | Blistering | Cross cut | Cross hatch | Salt spray test |
|---|---|---|---|---|
| (M1) (white, NCO/OH = 6.5) | m0g0 | GT0 | 0 | 3-4 |
| (M2) (black, NCO/OH = 8.2) | m0g0 | GT0 | 0 | 3-4 |
| (M3) (black, NCO/OH = 5.3) | m0g0 | GT0 | 0 | 3-4 |
| (M4) (black, NCO/OH = 4.1) | m1g2 | GT0 | 0 | 3-4 |
| (CM1) (black, NCO/OH = 1.8) | m4g1 | GT0 | 0 | 3-4 |
| (CM2) (phosphating, solvent-containing primer composition based on PVB) | m0g0 | GT0 | 0 | 3 |
| (CM3) (black, only polyisocyanurate (D2)) | m2g0 | GT0 | 0 | 3-4 |

TABLE 4-continued

Results of the investigation of performance properties b) Galvanized steel

|  | Blistering | Cross cut | Cross hatch |
|---|---|---|---|
| (M1) (white, NCO/OH = 6.5) | m0g0 | GT0 | 0 |
| (M2) (black, NCO/OH = 8.2) | m0g0 | GT0 | 0 |
| (M3) (black, NCO/OH = 5.3) | m1g1 | GT0 | 0 |
| (M4) (black, NCO/OH = 4.1) | m1g1 | GT0 | 0 |
| (CM1) (black, NCO/OH = 1.8) | m3g1 | GT1 | 0 |
| (CM2) (phosphating, solvent-containing primer composition based on PVB) | m0g0 | GT0 | 0 |
| (CM3) (black, only polyisocyanurate (D2)) | m2g2 | GT1 | 0 | c) Aluminum substrate

|  | Blistering | Cross cut | Cross hatch |
|---|---|---|---|
| (M1) (white, NCO/OH = 6.5) | m0g0 | GT0 | 0 |
| (M2) (black, NCO/OH = 8.2) | m0g0 | GT0 | 0 |
| (M3) (black, NCO/OH = 5.3) | m0g0 | GT0 | 0 |
| (M4) (black, NCO/OH = 4.1) | m0g0 | GT2 | 0 |
| (CM1) (black, NCO/OH = 1.8) | m0g0 | GT5 | 4 |
| (CM2) (phosphating, solvent-containing primer composition based on PVB) | m0g0 | GT1 | 0 |
| (CM3) (black, only polyisocyanurate (D2)) | m1g1 | GT2 | 0 |

The results set out in table 4 show that the inventive multicoat coating systems, produced using the inventive aqueous primer composition on different metallic substrates by the inventive method, exhibit outstanding adhesion properties and hence possess very good corrosion resistance. In particular it is apparent that the high NCO/OH ratio in accordance with the invention leads to very good properties. The properties, furthermore, are comparable with or even better than the properties achieved through the use of customary, solvent-based primer compositions and primers. It is therefore apparent overall that through the use of the primer composition of the invention it is possible to combine an environmentally valuable profile with a simplified multicoat coating procedure, nevertheless resulting in outstanding adhesion properties and anticorrosion properties.

The invention claimed is:

1. An aqueous two-component primer composition comprising
   (1) a paint base component comprising
      (A) at least one polyurethane resin having an OH number of 5 to 80 mg KOH/g,
      (B) zinc phosphate,
      (C) at least one pigment,
   and
   (2) a curing component comprising
      (D1) at least one polyisocyanate which is an isocyanurate based on hexamethylene diisocyanate, (D2) at least one polyisocyanate which is a polyether-modified isocyanurate based on isophorone diisocyanate, where the stoichiometric ratio of isocyanate groups of the isocyanurates (D1) and (D2) to the hydroxyl groups present in the at least one polyurethane resin (A) is a ratio from greater than 3 to a ratio of 10.

2. The aqueous two-component primer composition as claimed in claim 1, wherein the at least one polyurethane resin (A) has an OH number of 5 to 60 mg KOH/g.

3. The aqueous two-component primer composition as claimed in claim 2, wherein the at least one polyurethane resin (A) has an acid number of 10 to 40 mg KOH/g.

4. The aqueous two-component primer composition of claim 1, wherein the fraction of the at least one polyurethane resin (A) is 6% to 30% by weight, based on the total amount of the primer composition.

5. The aqueous two-component primer composition of claim 1, wherein the fraction of the zinc phosphate (B) is 3% to 20% by weight, based on the total amount of the primer composition.

6. The aqueous two-component primer composition as claimed in claim 1, wherein the pigments (C) are selected from the group of black pigments and white pigments.

7. The aqueous two-component primer composition as claimed in claim 1, wherein the at least one isocyanurate (D1) has an isocyanate content of 8% to 13% and the at least one polyether-modified isocyanurate (D2) has an isocyanate content of 7% to 12%.

8. The aqueous two-component primer composition as claimed in claim 1, wherein the fraction of the at least one isocyanurate (D1) is 1.5% to 7.5% by weight and the fraction of the at least one hydrophilically modified isocyanurate (D2) is 3% to 10% by weight, based in each case on the total amount of the primer composition.

9. The aqueous two-component primer composition as claimed in claim 1, further comprising a filler (E).

10. The aqueous two-component primer composition as claimed in claim 1, wherein the stoichiometric ratio of the isocyanate groups of the isocyanurates (D1) and (D2) to the hydroxyl groups present in the at least one polyurethane resin (A) is 4 to 10.

11. The aqueous two-component primer composition as claimed in claim 1, comprising at least 25% by weight of water, based on the total weight of the primer composition, and wherein the fraction of organic solvents, based on the total weight of the primer composition, is less than 15% by weight.

12. The aqueous two-component primer composition as claimed in claim 1, wherein the stoichiometric ratio of the isocyanate groups of the isocyanurates (D1) and (D2) to the hydroxyl groups present in the at least one polyurethane resin (A) is a ratio from 3.5 to 10.

13. A method for producing a coating by
(1) applying a primer composition as claimed in claimed in claim 1 directly to a metallic substrate, and
(2) forming a polymer film from the primer composition applied in stage (1).

14. The method as claimed in claim 13, wherein the metallic substrate is a substrate coated with an automotive finish having regions of damage to repair the damaged regions.

15. The method as claimed in claim 13, comprising applying at least one further coating composition which is cured together with the applied primer composition.

16. The method as claimed in claim 15, wherein two further coating compositions are applied, the first further coating composition being a basecoat material and the second further coating composition being a clearcoat material.

17. A coated substrate coated by the method as claimed in claim 13.

* * * * *